United States Patent Office 2,934,366
Patented Apr. 26, 1960

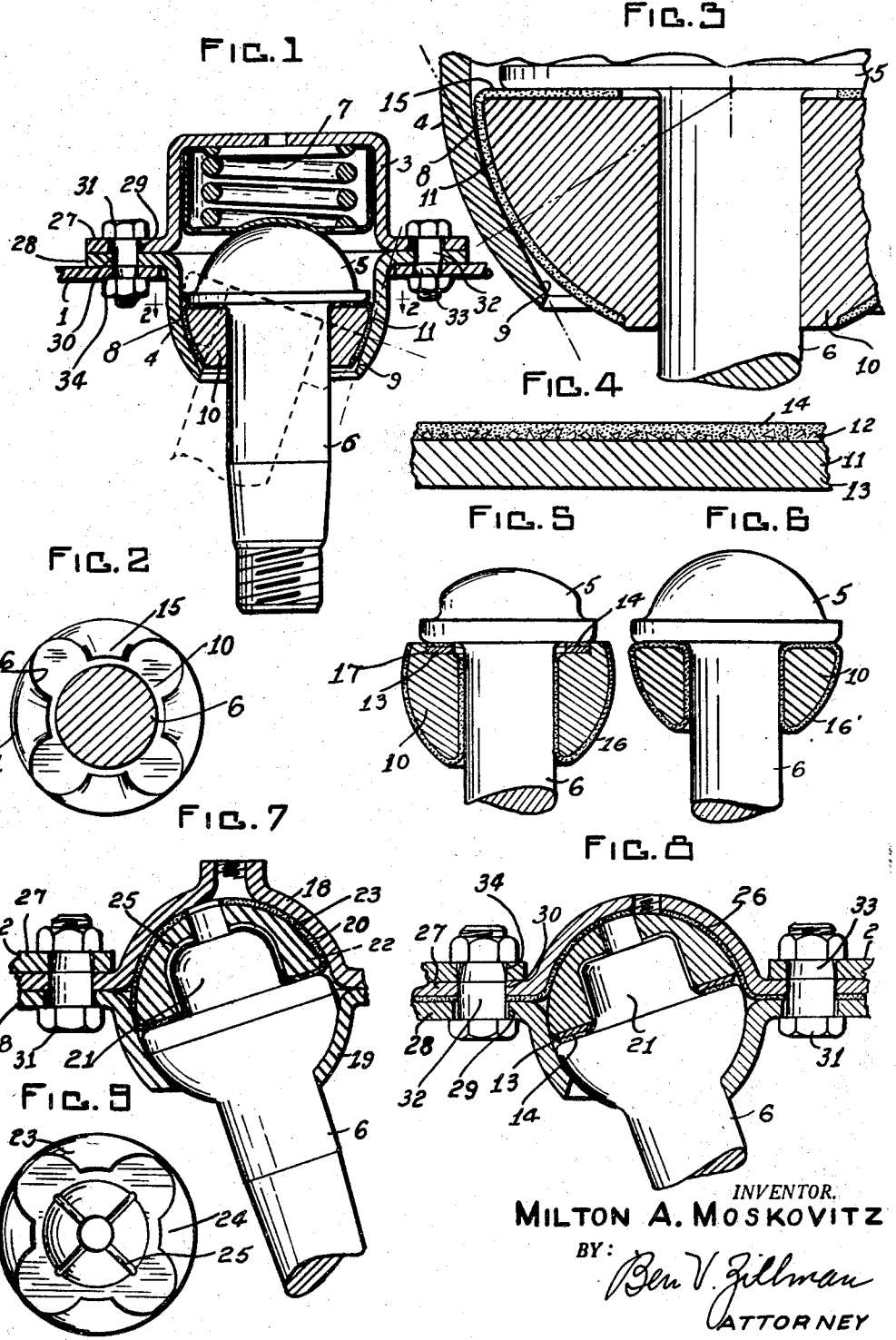

2,934,366

PRE-ASSEMBLED BALL AND SOCKET JOINT

Milton A. Moskovitz, Richmond Heights, Mo., assignor of one-half to Harry Frankel, St. Louis, Mo.

Original application November 29, 1955, Serial No. 549,693, now Patent No. 2,885,235, dated May 5, 1959. Divided and this application March 4, 1959, Serial No. 797,247

7 Claims. (Cl. 287—90)

This invention relates to a ball joint assembly of the type that is especially adapted for interconnecting the relatively movable parts of a motor vehicle, as for instance for placement in a part of the steering mechanism or the wheel suspension of the same, and is a division of my application Serial No. 549,693, filed November 29, 1955, now Patent No. 2,885,235.

The main object of my invention is to so construct said joint, that it includes a casing made of a pair of hollow shells to receive a stud universally movable therein with its shank portion projecting through one end of the casing, and so interconnecting said mechanism as a completely pre-assembled device with said shells in predetermined operative relation, to not only hold all of the parts of the device together for subsequently handling the same, but permitting the mounting of said assembled unit easily and readily, properly centered on the supporting member with which it is to be associated, such as the plate or control arm of the vehicle, all without disturbing the fixed relationship of said pre-asembled unit.

Many other objects and advantages of the construction herein shown and described, and the uses and advantages thereby obtained, will be obvious to those skilled in the art to which this invention appertains, all as will be apparent from the disclosures hereinafter set forth.

To this end, my invention consists in the novel form, arrangement, construction and combination of parts herein shown and described, and as will be more clearly pointed out in the claims hereinafter appended.

In the drawings, wherein like reference characters represent like or corresponding parts throughout the views, Figure 1 is a vertical cross-sectional view through a joint, showing a fragment of a control arm to which it is connected;

Figure 2 is a horizontal cross-sectional view through the same, substantially along the line 2—2 of Fig. 1;

Figure 3 is an enlarged detail showing the bearing relation between the relatively movable elements of the joint, as initially assembled;

Figure 4 is a highly magnified detail through the thickness of the composite bearing element shown in Fig. 3;

Figures 5 and 6 are details of modified forms of joints, with the casing omitted;

Figures 7 and 8 are cross-sectional views of modified forms of joints; and

Figure 9 is a plan view of the bushing shown in Fig. 7, having its sheath secured thereto, as viewed from the planar end of the bushing.

Referring more particularly to the drawings, wherein I have illustrated preferred embodiments of my invention, there are shown ball and socket type joints especially intended for interconnection between the front wheel steering knuckle and the control arms of the vehicle, the joints shown in Figs. 1–6 inclusive for interconnection with the upper control arm 1 and for stabilizing the upper end of the steering knuckle, while the joints shown in Figs. 7–9 inclusive are for interconnection with the lower control arm 2 of the vehicle, said joints being initially completely assembled and installable on the control arms without any disturbing of said assembled relationship while installing them in place.

In the forms shown in Figs. 1–6 inclusive there is shown a housing or casing composed of a pair of hollow mating shells 3 and 4 to together form a chamber that is open at one end, as for instance at the lower end.

A steel stud, provided with a rounded or convex radially enlarged head 5 and an axially extending shank 6 is rotatably and tiltably movable within said casing, said shank projecting outwardly through said open end of the casing, and any suitable resiliently yieldable pressure means 7 is mounted within said casing to constantly urge said stud outwardly through the casing.

The lower shell 4 is formed with an internal concave bearing surface 8 therein, but it is to be particularly noted that this spherically rounded bearing portion terminates at a point that is spaced inwardly or rearwardly of said open end of the casing, and from that point outwardly to said open end the chamber bounding wall continues as a flared or tapered conical surface 9, with the angle of taper being substantially tangent to the concave bearing surface as indicated in dotted lines in Figs. 1 and 3.

A bushing 10 is interposed between the stud and the shell bearing surface to engage the latter as relative movement occurs between the parts, and in the forms shown in Figs. 1–6 inclusive the bushing is bored to receive the stud shank and has a convex exterior that is approximately concentric with the concave bearing surface of the casing.

In order to minimize friction between the relatively movable parts and still maintain the requisite mechanical strength, only the core of the bushing is made of a strong and sturdy material, such as steel, well able to withstand shocks and load and to rapidly dissipate heat from the cooperating bearing surfaces, the convex exterior of this core being of such size and shape and of sufficiently small radius to be spaced from the opposed concave bearing surface of the casing, the top of this core being substantially planar, and in the forms shown in Figs. 1–4, said planar face is spaced from the correspondingly planar face of the under side of the stud head.

An anti-friction sheath 11 is interposed between the rounded face of said core and the opposed bearing surface of the casing, and is secured to said core to permit its exterior face to slidably engage the casing bearing face.

This exterior surface of the sheath is made of a material that has an extremely low coefficient of friction, as for example, of a plastic or plastic-impregnated material such as nylon, polytetrafluorethylene or fluorocarbon resin, etc.

Inasmuch as such resin by itself is limited in its use as an anti-friction material, to light loads and low speeds due to its poor thermal conductivity, poor temperature stability as compared with metals, its high coefficient of thermal expansion, its tendency to cold flow and its elastic memory, I have combined such resin physically with other material into a composite integral unit sheet that will properly carry off the heat generated during service and will provide support and give dimensional stability that is lacking in the resin itself.

I therefore make the composite sheath by applying a matrix or layer of a substantially porous material such as bronze powder 12 to the surface of a steel backing sheet 13, then sintering said powder in a reducing atmosphere to bond it to said backing sheet. The porous bronze surface of the resulting bimetallic strip is then impregnated with the resin 14, and with application of heat and pressure and using sufficient resin to fill the voids of the bronze and mechanically interlock said matrix and have the resin preferably project sufficiently above the latter to provide a thin layer of pure resin thereat.

Although the sheath thus produced could be used dry, it is preferable that a liquid lubricant be used in most cases, as this increases the rate of heat dissipaton and permits of more severe operating conditions. The matrix is only a few thousandths of an inch thick, and the resin is not much thicker, projecting perhaps a few thousandths of an inch therebyond, while the steel backing is many times thicker than the combined thicknesses of the bronze and resin, say at least $\frac{1}{16}''$, to afford proper strength to the sheath.

The composite sheath thus produced, although it may be initially flat, may then be shaped as required, and in Figs. 1–3 is shown wrapped about the convex exterior of the core to tightly hug the latter, its upper end having circumferentially spaced-apart ears 15 with arcuate bounding edges therebetween, so that the ears may be bent flat onto the planar end of the core and extend to adjacent the stud shank, as shown in Fig. 2.

Now, when relative movement occurs between the stud and the bushing, the approximately circular pockets thus formed between the adjacent ears will entrap lubricant therein to swirl and propel the lubricant toward the shank and along the opposed under face of the stud head.

In the forms shown in Figs. 1–6 inclusive, it is preferable that the bushing and the tangential surface of the chamber have such a relationship that when the stud has been moved to its limit of tilt in one direction, as indicated in dotted lines in Fig. 1, and with the one side of the bushing than being tilted upwardly, the opposed convex face of the sheath will bear on the chamber wall at approximately the innermost beginning of tangency of flare.

Another advantage thus obtained by providing such a tangentially flared end for the chamber is that a relative movement between the bushing and chamber wall, especially at stud tilt, will cause lubricant that is clinging to the bushing surface, in the flared portion of the chamber, to be carried upwardly and inwardly into the casing and afford excellent lubrication of the cooperating wear surfaces.

In Fig. 5, the sheath 16 envelopes the shank-receiving portion of the bushing core as well as being superimposed to cover the convex exterior of the latter, thus reducing wear of the shank, while in Fig. 6, the sheath 16' is completely enclosing the bushing core.

In addition, a separate sheath, in the form of a ring or washer 17, having the relatively thin plastic coating with a relatively thicker steel backing strip as previously described, may be interposed between said core and under side or radial flange of the stud head, as indicated in Fig. 5, so that said resin face will be complemental to the planar face of said stud head with a minimum of friction therebetween, while the steel face will be rotatable on the bushing core, whereby the greater frictional contact between said core and ring will permit easy rotation between the stud and bushing, and with a tendency of the ring to rotate together with the bushing.

In the modification shown in Fig. 7, the hollow casing comprises a pair of hollow chambered mating shells 18—19 having a substantially spherical inner wall, one of the shells provided with a concave bearing surface 20 to engagingly cooperate with the sheathed bushing. Here, the stud has an axially projecting portion 21, extending beyond the stud head in a direction opposite to that of the stud shank, this projecting portion receiving the bored bushing core 22 rotatably thereon.

A sheath 23 as previously made is wrapped onto said convex core of the bushing to approximately be complemental to said bearing surface 20, said sheath preferably having the upstanding circumferentially spaced-apart ears 24 with arcuately shaped openings therebetween to form the lubricant-holding pockets as previously set forth, and for the same purpose, after said ears are bent down into superimposement with the planar end of the bushing core (see Figs. 7 and 9). If desired, additional lubricant passages 25 may be provided in the bushing to permit ready travel of lubricant therealong as indicated.

In the modification shown in Fig. 8 the stud is substantially like that shown in Fig. 7, and the bushing core itself is not sheathed, but instead, a sheath 26 is secured to the concave bounding wall of one of the pair of casing shells to form a liner of the latter, and in such case a ring or washer substantially like that shown in Fig. 5 and for a like purpose, is interposed between the planar ends of the bushing and stud head, so that here too, there is more tendency for the washer to rotate with the bushing than with the stud.

In the several forms of joint shown, the casing sections or shells are interlocked initially into an assembly to secure them as a complete unit with the movable parts contained therein, so as to permit such joint to be handled without likelihood of loss of parts or of any alteration or displacement of them, and may be installed onto the control arm or the like without disturbing such predetermined relaionship.

To this purpose, the casing shells may be provided with opposed radially extending flanges 27—28. At suitably circumferentially spaced-apart intervals bolt holes 29 may be provided through the flange of one of said mating shells, and at like intervals bolt holes 30 may be provided through the flange of the other shell, these holes 29—30 being in registry when the shells are drawn together to form the casing, but with the holes of one set, as for instance the holes 29 being of larger diameter than those of the other set of holes 30.

A bolt having a radially enlarged head 31 with a shank portion 32 extending therefrom, and with a decreasingly tapered tip portion 32 extending beyond said portion 32, is passed through each pair of registered bolt holes, this shank portion 32 being smaller than the diameter of the holes 29 to pass easily and freely therethrough, but requiring being driven through the holes 30 to force-fit in the latter, the length of said shank portion 32 being approximately equal to the combined axial lengths of the pair of registered holes 29 and 30. Thus, the joint unit is positively maintained in its initially assembled relationship as soon as said bolts have been driven into place.

Now, when it is desired to install the unit on the control arm, this may be easily and conveniently accomplished, inasmuch as the reduced tip of the bolts may be readily passed through the properly located bolt holes 34 of the control arm that have been brought into registry with the already registered holes 29—30, said holes 34 being substantially of the same diameter as the holes 30, whereby the bolts are held firmly on the joint unit and will be substantially self-centering in said holes 34, with the largest diameter of said tip portion substantially filling said hole area 34.

It is also to be noted that I prefer to make the length of the main portion 32 of the shank of the bolts of a length that is substantially equal to the combined depths of the registered bolt holes 29—30.

I claim:

1. In a ball and socket type joint that is mountable as an already assembled completed unit to a supporting member that has a bolt hole therethrough, a casing having a stud universally mounted therein and comprising a pair of hollow mating shells drawn together into fixed relation, each of said shells having a bolt hole therethrough and with the hole through one of said shells being of larger diameter than that through the other shell so that when said shells are drawn together into operative position to form the casing said larger diameter hole will be in registry with said smaller diameter hole, and a headed bolt inserted through said registered holes and of such diameter that the portion of its length closest to the head passes loosely through said larger of the shell holes and an adjacent portion of its length is drivingly fitted into said smaller of the shell holes to fixedly interlock said shells together as an already completely assembled unit, with said stud therein, for operative mounting to said supporting member through said bolt hole of the latter without withdrawal of said bolt from said unit.

2. A ball and socket type joint of the kind set forth in claim 1, further characterized in that said bolt head is superimposed on the outermost face of the shell that has the larger diameter hole.

3. A ball and socket type joint as set forth in claim 2, further characterized in that said bolt has a decreasingly tapered tip to reduce its diameter thereat for initial free insertion through said registered holes of the pair of shells.

4. A ball and socket type joint as set forth in claim 3, further characterized in that the length of said tip is approximately the same as that of the depth of the hole in said supporting member.

5. A ball and socket type joint as set forth in claim 4, further characterized in that the diameter of said bolt at the larger end of said tip is substantially the same as the diameter of the bolt hole in said supporting member.

6. A ball and socket type joint as set forth in claim 1, further characterized in that the bolt hole through said supporting member is of substantially the same diameter as said smaller bolt hole through said shell.

7. A ball and socket type joint adapted for mounting as a unit without disturbing its assembled relationship onto a supporting member that has a plurality of spaced-apart bolt holes therethrough, said joint including a pair of hollow mating shells drawn together to form a casing with superimposed radial flanges, each shell having spaced-apart bolt holes through its flange so that when said shells are in assembled relation the bolt holes of one shell will register with those of the other shell, the bolt holes through one of said flanges being of larger diameter than those through the other flange, and the bolt holes through said supporting member being of substantially the same diameter as said smaller holes and registrable with said registered holes of said pair of flanges, and a bolt extending through each set of registered holes of the shells and of the supporting member and having its head engaging the opposed face of the outermost flange, the bolt having a main shank portion of substantially the same length as that of the combined depths of the holes through said pair of flanges so as to pass loosely through the larger hole and drivingly fit in said smaller hole, said shank provided with a decreasingly tapered tip to pass outwardly through the bolt hole that is in the supporting member and with its greatest diameter substantially the same size as the bolt hole through said supporting member, so that said bolt will self-center said joint in mounting it on said supporting member.

References Cited in the file of this patent

UNITED STATES PATENTS

| | | |
|---|---|---|
| 1,332,760 | Saitta | Mar. 2, 1920 |
| 1,401,075 | Hartwig | Dec. 20, 1921 |
| 2,614,862 | Alldredge et al. | Oct. 21, 1952 |
| 2,652,265 | Booth et al. | Sept. 15, 1953 |